United States Patent
Fontaine et al.

(10) Patent No.: US 8,327,486 B2
(45) Date of Patent: Dec. 11, 2012

(54) DEPLOYABLE RAMP ASSEMBLY

(75) Inventors: Yves Fontaine, Montreal (CA); Michel Morin, St-Jean-sur-Richelieu (CA)

(73) Assignee: Fedico Inc., St-Hubert (CA)

( * ) Notice: Subject to any disclaimer, the term of this patent is extended or adjusted under 35 U.S.C. 154(b) by 390 days.

(21) Appl. No.: 12/579,619

(22) Filed: Oct. 15, 2009

(65) Prior Publication Data

US 2011/0088178 A1    Apr. 21, 2011

(51) Int. Cl.
    *E01D 1/00*    (2006.01)
(52) U.S. Cl. ............... 14/71.1; 14/69.5; 414/921
(58) Field of Classification Search ........ 14/69.5, 14/71.1, 71.3, 71.7; 414/480, 537, 921
    See application file for complete search history.

(56) References Cited

U.S. PATENT DOCUMENTS

| | | | | |
|---|---|---|---|---|
| 2,456,805 | A | * | 12/1948 | Wohlforth .................. 414/556 |
| 4,014,486 | A | * | 3/1977 | Nelson et al. ............. 244/129.6 |
| 4,392,771 | A | | 7/1983 | Smalley |
| 4,647,270 | A | * | 3/1987 | Maloney ...................... 414/470 |
| 5,277,275 | A | * | 1/1994 | Ablabutyan ................. 187/272 |
| 5,284,414 | A | * | 2/1994 | Kempf ......................... 414/545 |
| 5,325,558 | A | | 7/1994 | Labreche |
| 5,382,130 | A | * | 1/1995 | Kempf ......................... 414/540 |
| 5,391,041 | A | | 2/1995 | Stanbury et al. |
| 5,393,192 | A | | 2/1995 | Hall et al. |
| 5,433,580 | A | * | 7/1995 | Kempf ......................... 414/540 |
| 5,556,250 | A | | 9/1996 | Fretwell et al. |
| 5,636,399 | A | | 6/1997 | Tremblay et al. |
| 5,676,515 | A | | 10/1997 | Haustein |
| 5,678,984 | A | * | 10/1997 | Petersen ....................... 414/537 |
| 5,832,555 | A | | 11/1998 | Saucier et al. |
| 6,010,298 | A | | 1/2000 | Cohn et al. |
| RE36,805 | E | * | 8/2000 | Kempf ......................... 414/545 |
| 6,179,545 | B1 | | 1/2001 | Petersen, Jr. et al. |
| 6,186,733 | B1 | | 2/2001 | Lewis et al. |
| 6,210,098 | B1 | | 4/2001 | Cohn et al. |
| 6,343,908 | B1 | | 2/2002 | Oudsten et al. |
| 6,409,458 | B1 | | 6/2002 | Cohn et al. |
| 6,430,769 | B1 | | 8/2002 | Allen |
| 6,470,523 | B1 | | 10/2002 | Sardonico |
| 6,602,041 | B2 | | 8/2003 | Lewis et al. |
| 6,698,998 | B2 | | 3/2004 | Koretsky et al. |
| 6,802,095 | B1 | | 10/2004 | Whitmarsh et al. |
| 6,843,635 | B2 | | 1/2005 | Cohn |

(Continued)

FOREIGN PATENT DOCUMENTS

CA    2229680    11/2001

(Continued)

*Primary Examiner* — Robert Pezzuto
*Assistant Examiner* — Matthew D Troutman
(74) *Attorney, Agent, or Firm* — Norton Rose Canada LLP

(57) ABSTRACT

A deployable ramp assembly including a fixed ramp portion and a pivotable ramp portion connected thereto through a direct pivot connection to pivot between stowed and deployed positions defined at a first angle from one another, a cover member pivotally connected to the fixed portion to pivot between closed and opened positions defined at a second angle from one another which is substantially smaller than the first angle, a drive assembly pivoting the cover member between the closed and opened positions, and a multiplier assembly interconnecting the pivotable portion and the cover member to transfer the pivoting motion of the cover member to the pivotable portion in an amplified manner, the multiplier assembly bringing the pivotable portion in the stowed position when the cover member is in the closed position and the pivotable portion in the deployed position when the cover member is in the opened position.

20 Claims, 11 Drawing Sheets

U.S. PATENT DOCUMENTS

| | | |
|---|---|---|
| 6,860,701 B2 | 3/2005 | Kiser |
| 7,001,132 B2 | 2/2006 | Koretsky et al. |
| 2006/0099061 A1* | 5/2006 | Smith et al. .................. 414/537 |
| 2006/0104773 A1* | 5/2006 | Koretsky et al. .............. 414/537 |
| 2006/0245883 A1 | 11/2006 | Fontaine et al. |
| 2008/0187425 A1 | 8/2008 | Morris et al. |
| 2008/0271266 A1 | 11/2008 | Johnson |
| 2008/0271269 A1 | 11/2008 | Morris et al. |
| 2009/0035113 A1 | 2/2009 | Morris et al. |

FOREIGN PATENT DOCUMENTS

| | | |
|---|---|---|
| CA | 2630373 A1 | 2/2009 |

\* cited by examiner

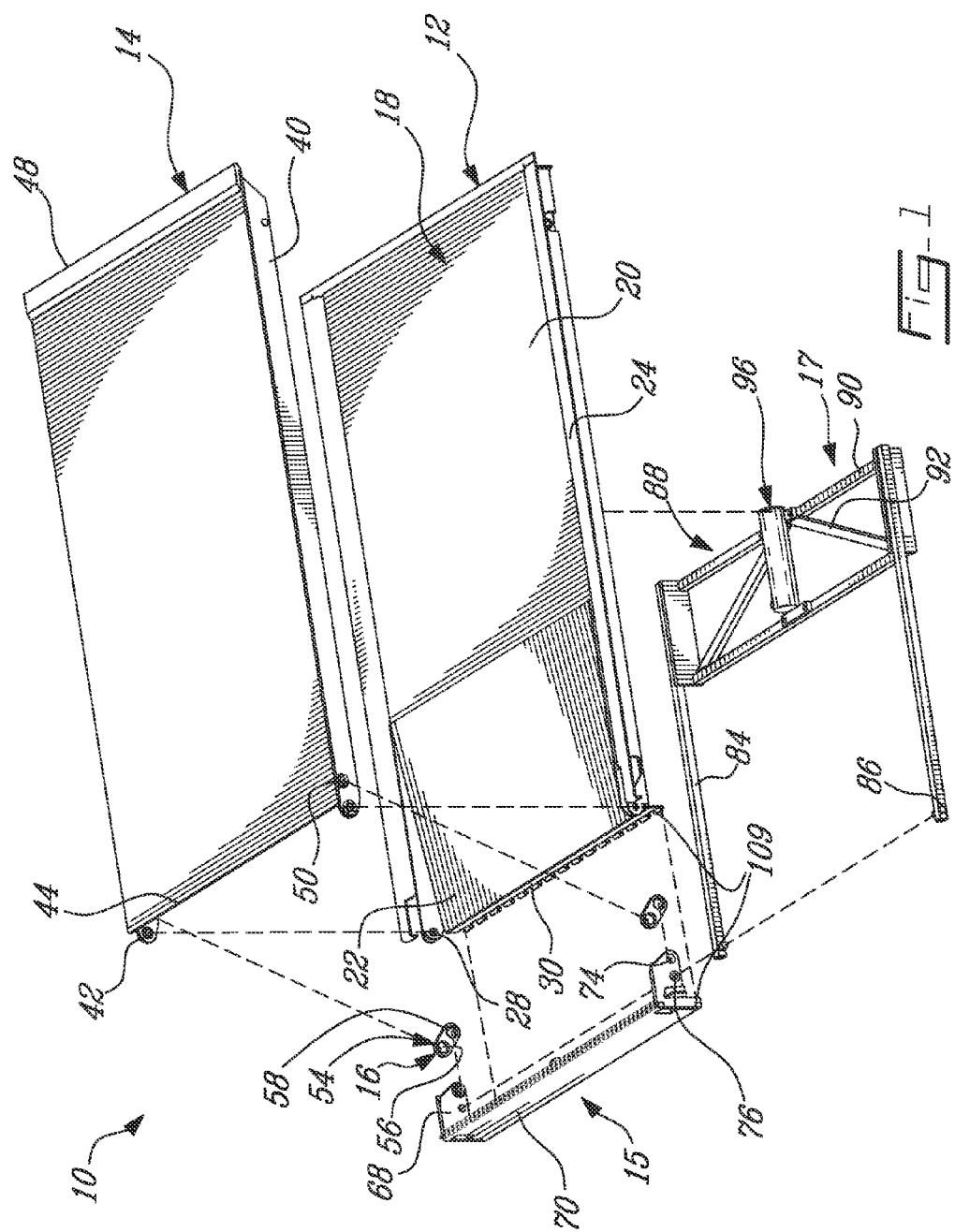

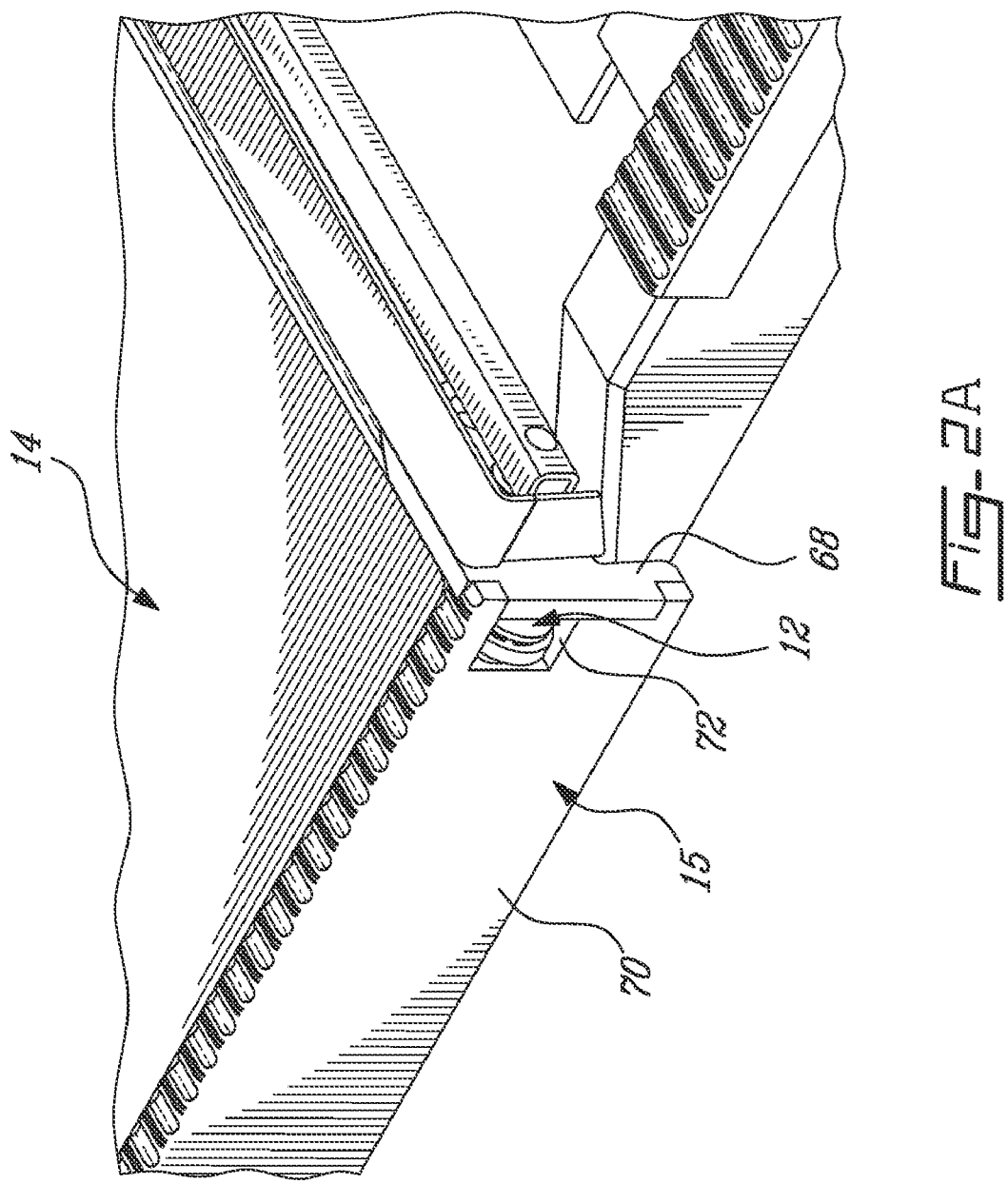

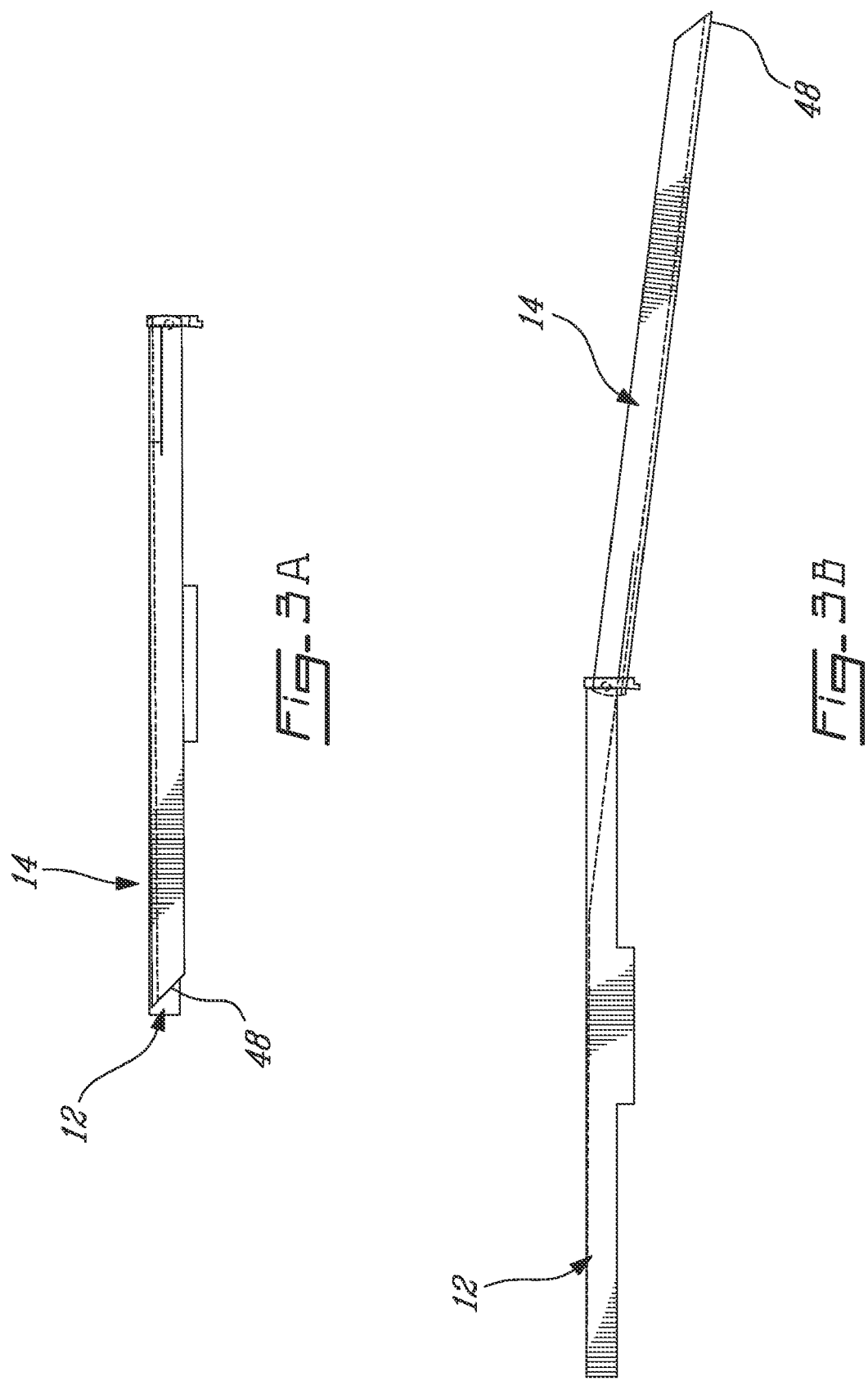

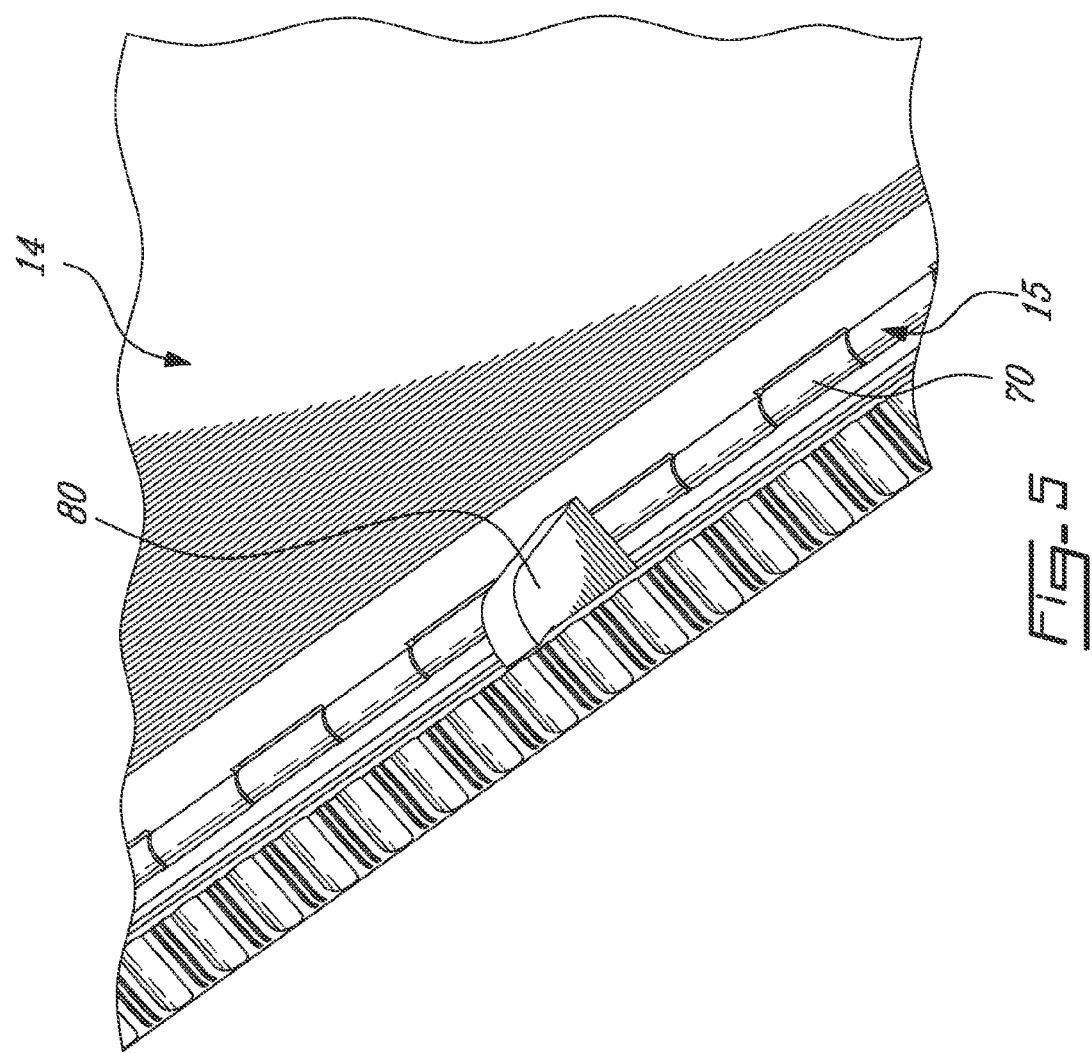

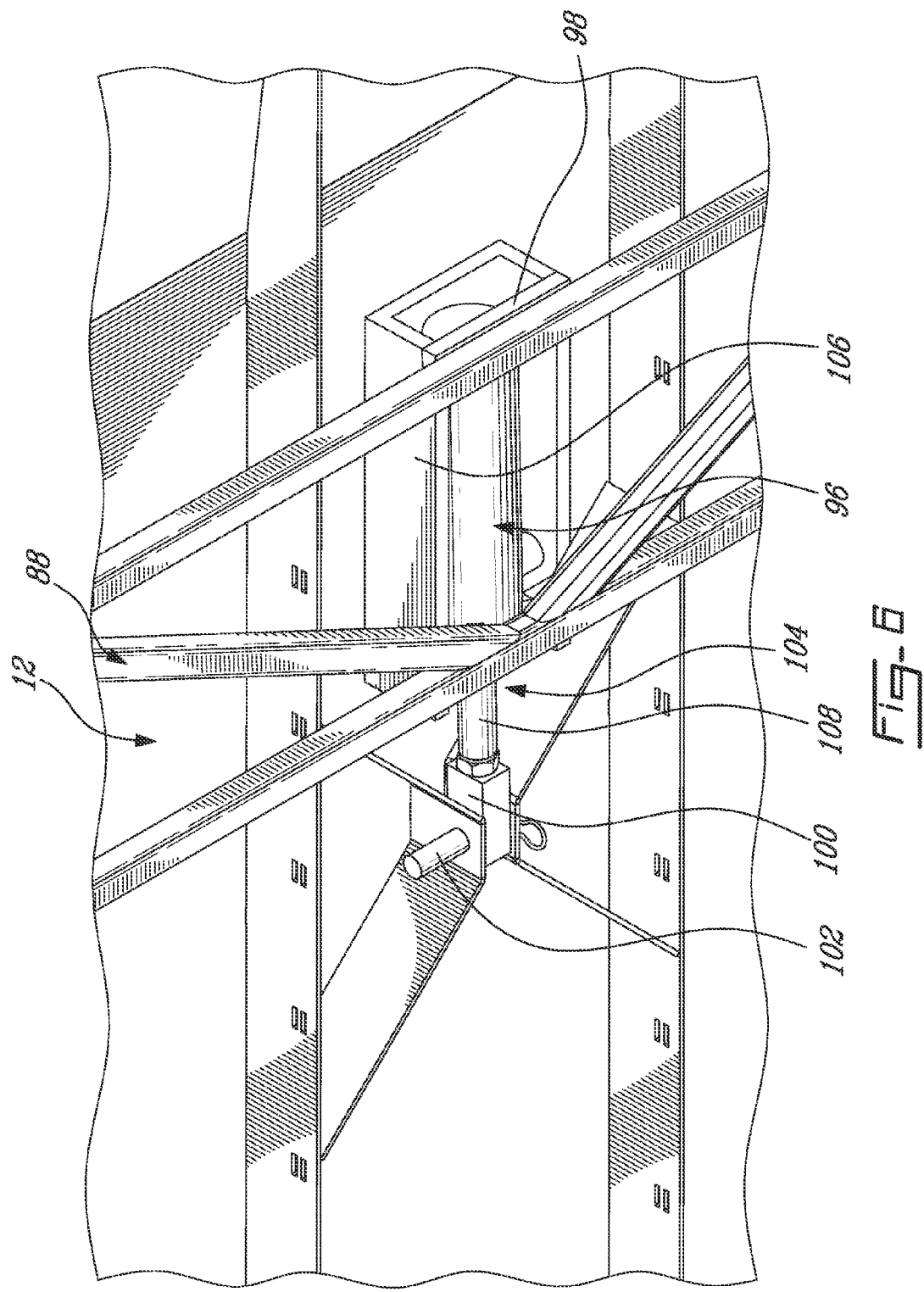

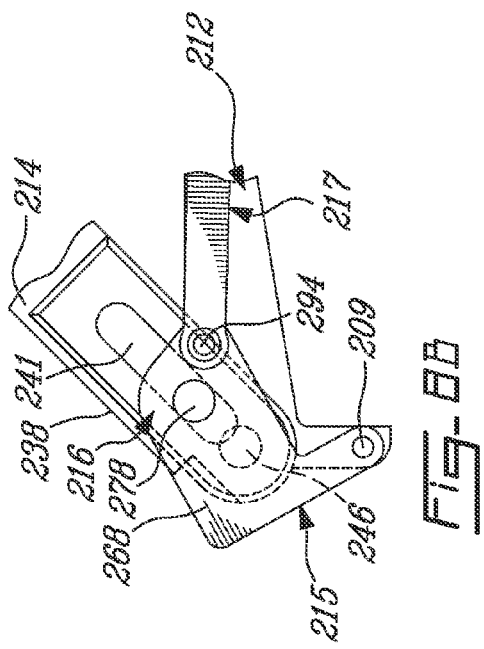
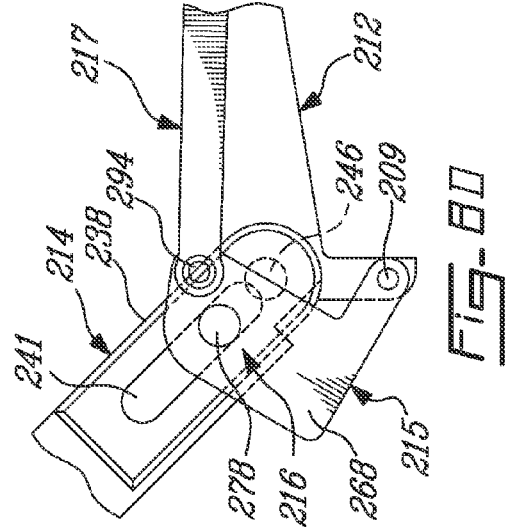
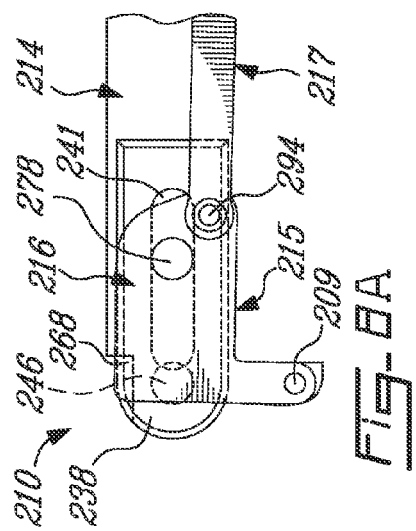
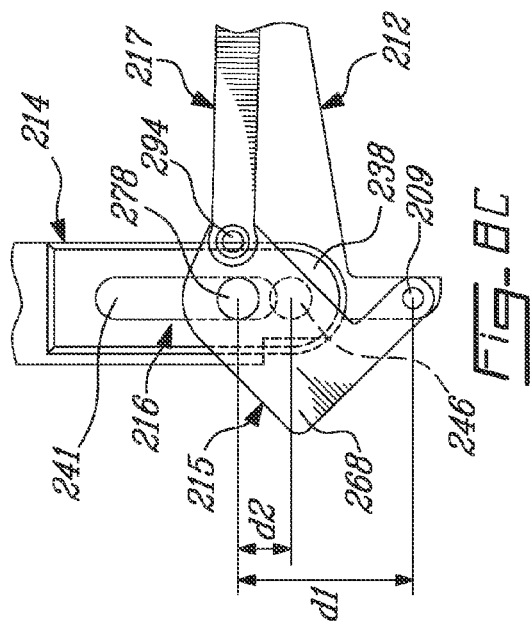

DEPLOYABLE RAMP ASSEMBLY

TECHNICAL FIELD

The present invention relates to deployable ramps for vehicles, and more particularly to such ramp assemblies having a pivotable ramp portion.

BACKGROUND

Deployable ramp assemblies for vehicles, for example deployable wheel chair ramps for buses, exist in a variety of configurations. Examples include ramp assemblies with a deployable portion which is slidable in and out of a space defined under a fixed ramp portion, and ramp assemblies with a pivotable portion pivoting up to more than 180° from a stowed position against the fixed portion. Typical drive mechanisms for such ramp assemblies, e.g. gear mechanisms, chain drives, belt drives, and combinations thereof, are usually relatively complex, with a number of movable parts that may become disengaged, jammed, misaligned, etc. during use.

Accordingly, improvements are desirable.

SUMMARY

It is therefore an aim of the present invention to provide an improved deployable ramp assembly.

In accordance with one aspect of the present invention, there is provided a deployable ramp assembly comprising: a fixed ramp portion; a pivotable ramp portion pivotally connected to the fixed ramp portion through a direct pivot connection, the pivotable ramp portion being pivotable about the direct pivot connection between stowed and deployed positions defined at a first angle from one another, the pivotable ramp portion in the deployed position and the fixed ramp portion together defining a ramp surface; a cover member pivotally connected to the fixed ramp portion and pivotable relative thereto between closed and opened positions defined at a second angle from one another, the second angle being smaller than the first angle; a drive assembly pivoting the cover member between the closed position and the opened position; and a multiplier assembly interconnecting the pivotable ramp portion and the cover member, the multiplier assembly transferring the pivoting motion of the cover member to the pivotable ramp portion in an amplified manner, the multiplier assembly displacing the pivotable ramp portion into the stowed position when the cover member is displaced into the closed position by the drive assembly, and the pivotable ramp portion being displaced into the deployed position by the drive assembly when the cover member is displaced into the opened position.

Also in accordance with the present invention, there is provided a deployable ramp assembly for a vehicle, the ramp assembly comprising a fixed ramp portion having a first ramp surface and opposed side members extending therefrom, a pivotable ramp portion having a second ramp surface and opposed side members extending therefrom, the side members of the pivotable ramp portion being pivotally connected to the side members of the fixed ramp portion adjacent connecting ends thereof, the pivotable ramp portion being pivotable with respect to the fixed ramp portion between a stowed position and a deployed position, the first and second ramp surfaces in the deployed position defining an at least substantially continuous ramp, two parallel first link members each pivotally connected to a respective one of the side members of the pivotable ramp at a first location adjacent the connecting end thereof but more distanced therefrom than the connection between the side members of the pivotable and fixed ramp portions, two parallel second link members each pivotally connected to a respective one of the first link members at a second location and pivotally connected to the fixed ramp portion at a third location, two parallel drive members each pivotally connected to a respective one of the second link members at a fourth location intermediate the second and third locations, and a variable length member having one end connected to the drive members and an opposed end pivotally connected to the fixed ramp portion, the variable length member including at least one linear actuator linearly varying a distance between the opposed ends thereof such as to pivot the pivotable ramp portion between the stowed and deployed positions.

Further in accordance with the present invention, there is provided a method of deploying and retracting a ramp of a vehicle, the ramp having a fixed portion and a pivotable portion having pivotally interconnected ends, the method comprising pivoting a cover member about a first pivot defined on the fixed ramp portion between extreme positions located at approximately 90° to 100° from one another, and transferring the pivoting motion of the cover member in an amplified manner to pivot the pivotable ramp portion over a range of at least 180°.

BRIEF DESCRIPTION OF THE DRAWINGS

Reference will now be made to the accompanying drawings, showing by way of illustration a particular embodiment of the present invention and in which:

FIG. 1 is an exploded perspective view of a deployable ramp assembly according to a particular embodiment;

FIG. 2A is a perspective view of part of the ramp assembly of FIG. 1 in a stowed position;

FIG. 3A is a schematic side view of the ramp assembly of FIG. 1 in a stowed position;

FIG. 3B is a schematic side view of the ramp assembly of FIG. 1 in a deployed position;

FIG. 5 is a perspective view of part of a cover member of the ramp assembly of FIG. 1;

FIG. 6 is a perspective view of part of an underside of a fixed portion of the ramp assembly of FIG. 1, showing a connection with a drive assembly thereof;

FIGS. 8A-F are schematic side views of part of a ramp assembly according to an alternate embodiment, illustrating sequential positions during the deployment thereof, from a stowed position in FIG. 8A to a deployed position in FIG. 8E.

DETAILED DESCRIPTION

Figure 2B:
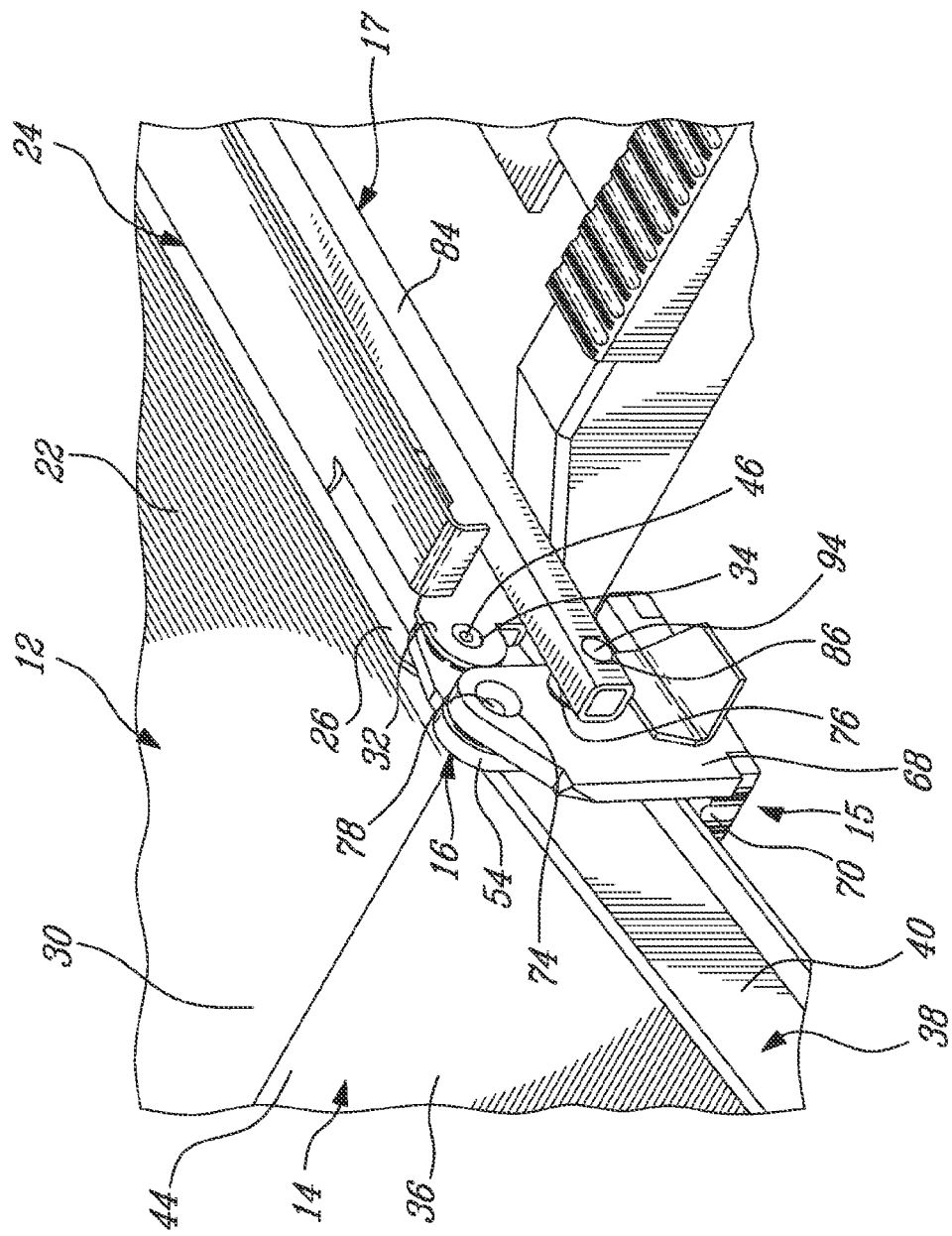
FIG. 2B is a perspective view of part of the ramp assembly of FIG. 1 in a deployed position.

Referring to FIG. 1, a ramp assembly 10 according to an exemplary embodiment is shown. The ramp assembly 10 generally includes a fixed ramp portion 12 which is adapted to be fixed to a vehicle (e.g. bus, not shown), a pivotable ramp portion 14 pivotally connected to the fixed ramp portion 12, a cover member 15 also pivotally connected to the fixed ramp portion 12, a drive assembly 17 pivoting the cover member 15, and a multiplier assembly 16 interconnecting the cover member 15 and pivotable ramp portion 14.

The fixed ramp portion 12 defines a ramp surface 18, which has a first part 20 intended to be leveled with a floor of the vehicle, and a second angled part 22 extending from the first part 20 in a downwardly angled manner. The fixed ramp portion 12 further includes side members 24 extending from the ramp surface 18. Referring to FIG. 2B, the side members 24 each include a side wall 26 extending upwardly from at least the angled part 22 of the ramp surface 18. Each side wall 26 includes a hole 28 (see FIG. 1) defined therethrough near the connecting end 30 of the fixed ramp portion 12. The side members 24 also each include an arm 32 outwardly spaced apart from the respective side wall 26 and including a hole 34 defined therethrough in alignment with the side wall hole 28.

The pivotable ramp portion 14 defines a ramp surface 36, which in the deployed position (FIGS. 2B, 3B) is at least substantially aligned with the angled part 22 of the ramp surface 18 of the fixed ramp portion 12 to form an at least substantially continuous ramp surface. The pivotable ramp portion 14 also includes side members 38 each including a side wall 40 extending upwardly from the ramp surface 36. Each side wall 40 has a first hole 42 (see FIG. 1) defined therethrough near the connecting end 44 of the pivotable ramp portion 14.

Figure 7A:
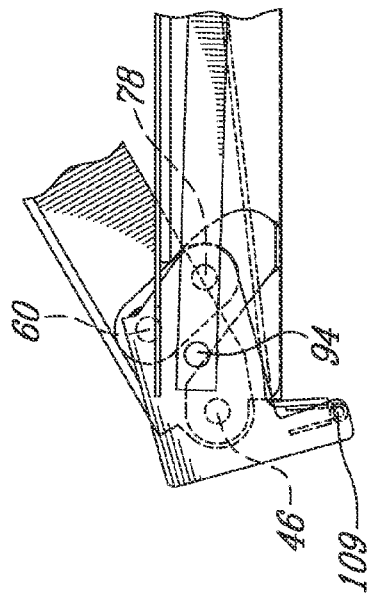
FIGS. 7A-H are schematic side views of part of the ramp assembly of FIG. 1 illustrating sequential positions during the deployment thereof, from a stowed position in FIG. 7A to a deployed position in FIG. 7H.
Figure 7B:
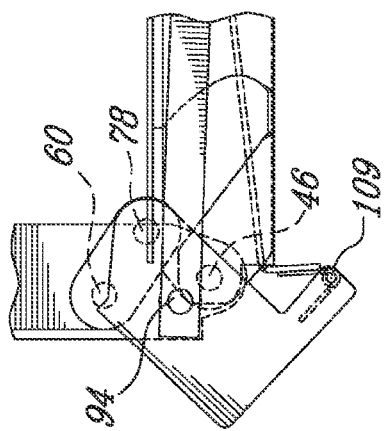
Figure 7C:
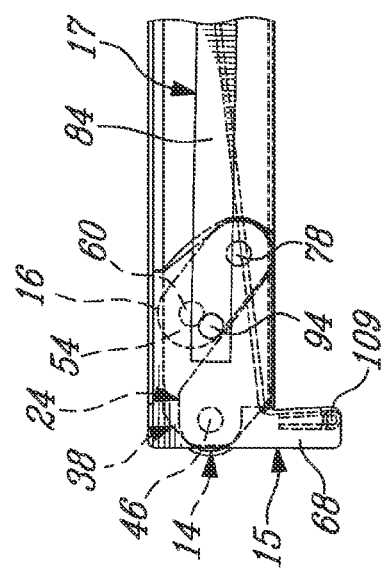
Figure 7D:
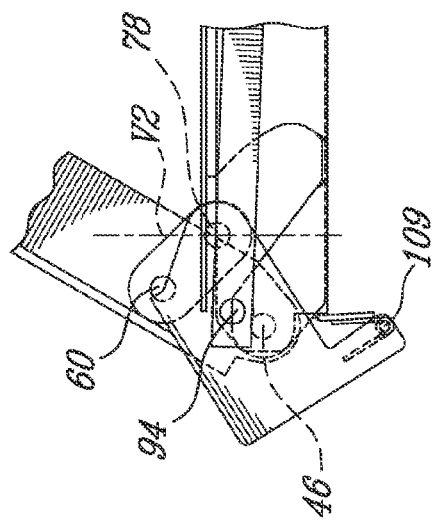
Figure 7F:
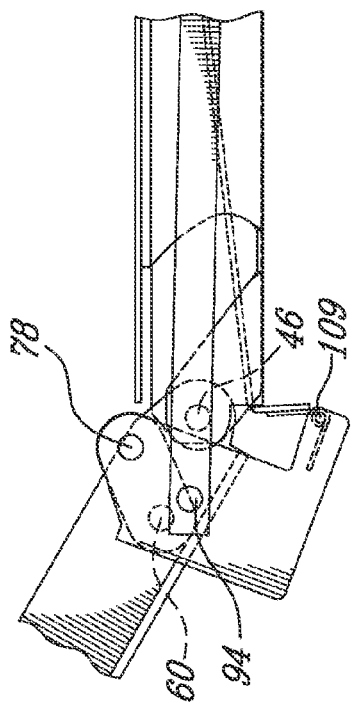

Each side member 38 of the pivotable ramp portion 14 is connected to a respective side member 24 of the fixed ramp portion 12 through a pivot connection 46 (see also FIG. 7A) extending through the aligned holes 28, 34, 42 of the side walls 26, 40 and the arm 32. The pivotable ramp portion 14 is pivotable about this pivot connection 46 from a stowed position (FIGS. 2A, 3A, 7A) where the pivotable ramp portion 14 overlays the fixed ramp portion 12 so that users of the vehicle can walk thereover, to a deployed position (FIGS. 3A, 3B, 7H), where the pivotable ramp portion 14 extends from the fixed ramp portion 12 in a downwardly angled manner, such that a free end 48 (FIG. 3B) of the pivotable ramp portion 14 lies against a ground surface. As such, the pivotable ramp portion 14 performs a rotation greater than 180° between the stowed and deployed positions. In a particular embodiment, the pivotable ramp portion performs a rotation of approximately 190° between the stowed and deployed positions.

Referring back to FIG. 1, the side walls 40 of the pivotable ramp portion 14 each have a second hole 50 defined therethrough in proximity of the connecting end 44, but further therefrom than the first hole 42.

Figure 4:
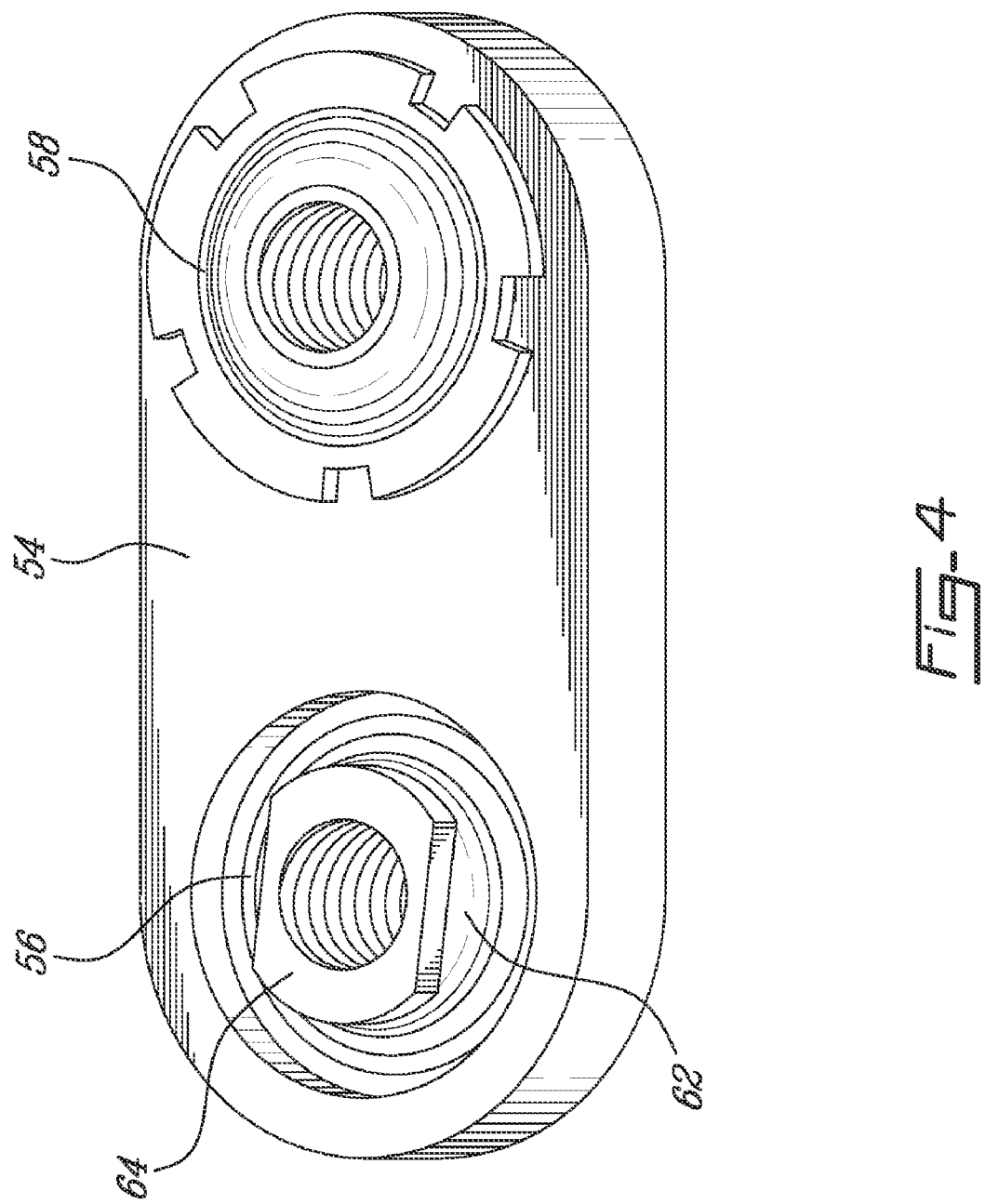
FIG. 4 is a perspective view of a multiplier link member of the ramp assembly of FIG. 1.

The multiplier assembly 16 includes two parallel identical link members 54 each including first and second spaced apart holes 56, 58 defined therein. Each multiplier link member 54 is connected to a respective side wall 40 of the pivotable ramp portion 14 by a pivot connection 60 (see FIG. 7A) through the second hole 50 of the side wall 40 and through the first hole 56 of the link member 54. Referring to FIG. 4, in the embodiment show, each hole 56, 58 of the link member 54 includes therein a bearing assembly 62 with a central internally threaded element 64 engaged with a threaded bolt (not shown) extending through the part which with the pivot connection is made, i.e. the hole 50 in the side wall 40 of the pivotable ramp portion 14 in the case of the multiplier link member's first hole 56.

In the embodiment shown, the two multiplier link members 54 are independent from one another. In an alternate embodiment which is not shown, the multiplier link members 54 are rigidly interconnected.

Figure 7H:
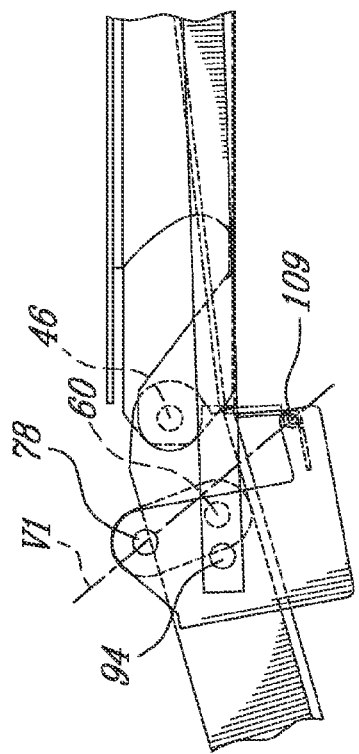
Figure 7E:
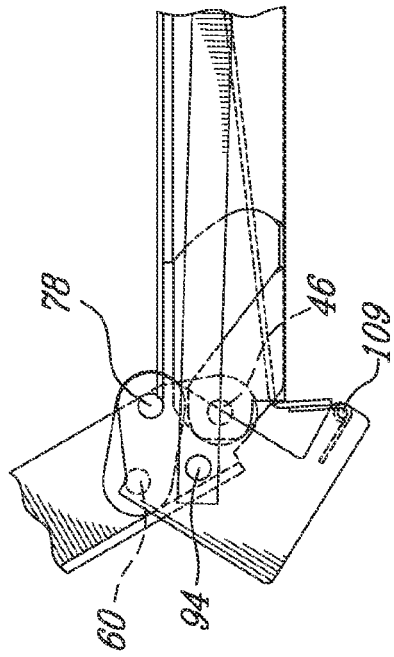
Figure 7G:
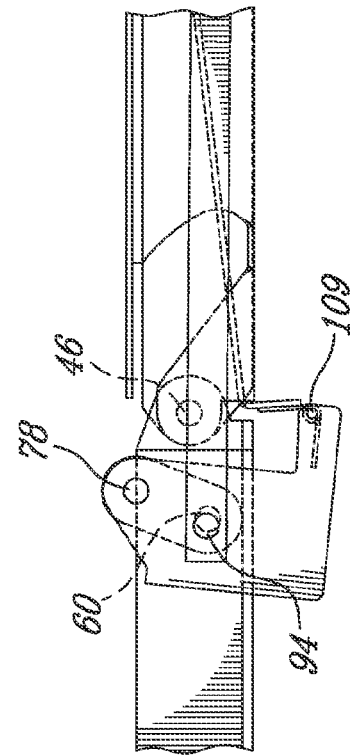
Figure 8F:
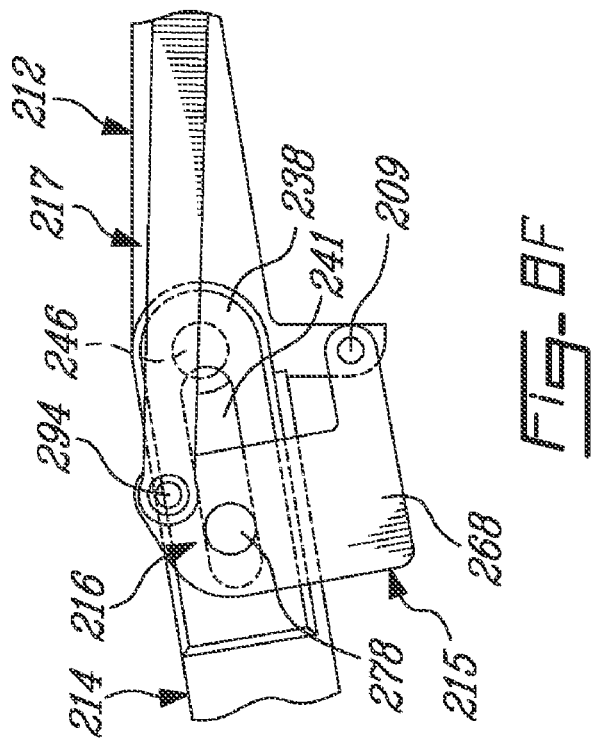
Figure 8E:
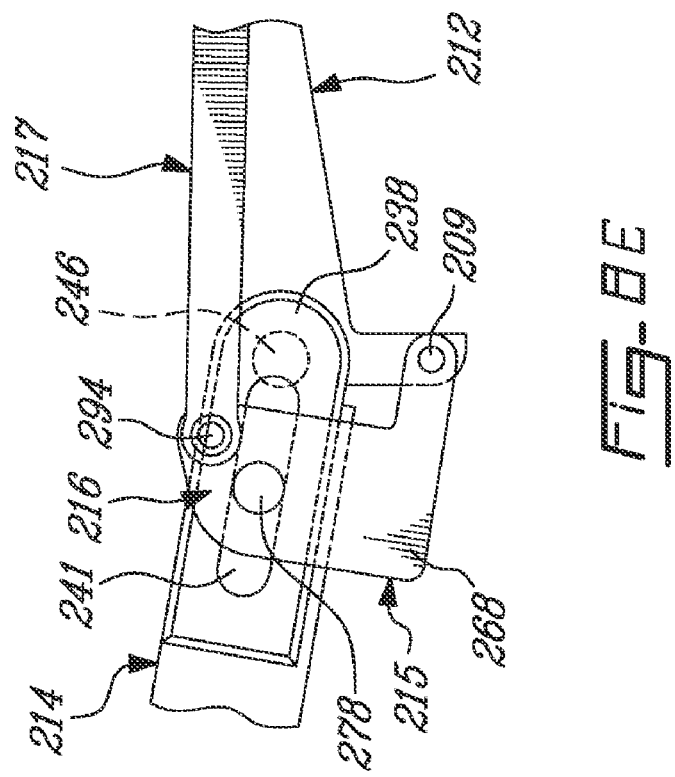

Referring to FIGS. 1 and 7A-H, the cover member 15 includes two parallel identical link members 68 rigidly interconnected by a transverse member 70. The cover member 15 is pivotally connected to the fixed ramp portion 12 through a pivot connection defined by a hinge 109 connected to the link members 68 and the transverse member 70. In the embodiment shown, the hinge 109 extends in vertical alignment with and below the pivot connection 46 between the fixed and pivotable ramp portions 12, 14. In an alternate embodiment, the hinge 109 is below the pivot connection 46 and approximately in vertical alignment therewith, i.e. may be slightly offset, e.g. a few millimeters, from a vertical axis defined by the pivot connection 46. The hinge 109 may be replaced by any other adequate type of pivot connection. The vertical or approximately vertical alignment of the pivot connections 46, 109 allow the pivoting movement of the cover member 15 to be performed tangentially or approximately tangentially to the pivot connection 46 between the ramp portions 12, 14. Alternate relative positions of the pivot connections 46, 109 are also considered. The cover member 15 is thus pivotable about the pivot connection 109 between a closed position (FIGS. 2A, 7A) and an opened position (FIGS. 2B, 7H). The angle between the closed and opened positions is substantially smaller than the angle between the stowed and deployed positions of the pivotable ramp portion 14. In a particular embodiment, the closed and opened positions are defined at approximately 90° to 100° from each other.

As can be seen in FIG. 2A, when the ramp assembly 10 is in the stowed position, the cover member 15 forms the visible end of the ramp assembly 10, and the transverse member 70 prevents access between the two ramp portions 12, 14, thus acting as a cover over the hinge 109. The cover transverse member 70 may includes an opening 72 adjacent each cover link member 68 to receive the interconnected parts of the connecting ends 30, 44 of the ramp portions 12, 14 in the stowed position.

Referring to FIG. 5, the cover transverse member 70 includes at least one support member 80 extending therefrom (only one of which is shown). Each support member 80 is sized and configured to extend between the pivotable and fixed ramp portions 12, 14 when the pivotable ramp portion 14 is in the stowed position and the cover member 15 in the closed position, such that the pivotable ramp portion 14 rests against the support member(s) 80. The tangential or approximately tangential pivoting motion of the cover member 15 with respect to the pivot connection 46 between the ramp portions 12, 14 allow for the support member(s) 80 to be fixed with respect to the remainder of the cover member 15 and to be inserted between the ramp portions 12, 14 when the cover member 15 rotates to the closed position without interference with the ramp portions 12, 14. The support member(s) 80 provides reinforcement for the pivotable ramp portion 14 which, in the stowed position, support the weight of the normal traffic of people entering and exiting the vehicle and walking over the stowed ramp to do so.

Referring to FIGS. 1-2B, each cover link member 68 includes first and second holes 74, 76 defined therein, with the second hole 76 being defined between the first hole 74 and the pivot connection 109. Each cover link member 68 is connected to a respective multiplier link member 54 by a pivot connection 78 (see also FIG. 7A) through the first and second hole 74, 58, respectively. As mentioned above, each multiplier link member 54 is also pivotally connected to the pivotable ramp portion 14, and transfers thereto the rotational motion of the cover member 15 in an amplified manner. The multiplier assembly 16 brings the pivotable ramp portion 14 in the stowed position when the cover member 15 is in the closed position, and in the deployed position when the cover member 15 is in the opened position. In a particular embodiment, the multiplier assembly 16 amplifies the rotational motion of the cover member 15 such that a ratio of angular displacement between the cover member 15 and the pivotable ramp portion 14 is approximately 2.

Referring back to FIGS. 1-2B, the drive assembly 17 is pivotally connected to the cover member 15 and to the fixed ramp portion 12, and performs the rotation of the cover member 15 about the pivot connection 109. The drive assembly includes two parallel identical elongated drive members 84 each having a hole 86 defined at one end thereof. Each drive member 84 is connected to a respective cover link member 68 by a pivot connection 94 (see also FIG. 7A) through the hole 86 of the drive member 84 and the second hole 76 of the cover link member 68.

As shown in FIG. 1, the drive members 84 are rigidly interconnected by a transverse member 88 at the end thereof opposed to the pivot connection 94. In the embodiment shown, the drive transverse member 88 includes two parallel transverse bars 90 and two angled bars 92 extending therebetween. Alternate configurations are also possible.

Referring to FIG. 6, the drive assembly 17 also includes a variable length member 96 which is rigidly connected to the drive transverse member 88 at one end 98 and has a second end 100 connected to an underside of the fixed ramp portion 12, spaced apart from the connecting end 30, through a pivot connection 102. In a particular embodiment, the pivot connection 102 is located under the first, level part 20 of the ramp surface. In alternate embodiments, the position of the pivot connection 102 may be moved closer to or further away from the connecting end 30, as long as the drive assembly can adequately pivot the cover member 15.

A drive mechanism 104 varies the length of the variable length member 96 and as such the effective length of the drive assembly 17, which is defined between the pivot connections 102, 94 with the fixed ramp portion 12 and with the cover link member 68. In the embodiment shown, the drive mechanism 104 includes a linear actuator which forms the variable length member 96 and as such defined part of the effective length. The linear actuator includes a casing 106 rigidly connected to the transverse member 88, and a slidable rod 108 pivotally connected to the fixed ramp portion 12. In a particular embodiment, the linear actuator is hydraulically powered. Alternately, other types of actuators can also be used.

In an alternate embodiment which is not shown, the variable length member 96 includes a linear actuator connected to each of the drive members 84. In this case, the drive members 84 can be independent from one another. The variable length member 96 may also include one or more reinforcement members in addition to the linear actuator(s).

In use, and referring to FIGS. 7A-H, the pivotable ramp portion 14 is deployed from the stowed position (FIG. 7A) through rotation of the cover member 15 from the closed position. The effective length of the drive assembly 17 is increased, through extension of the linear actuator 104. As the ends of the drive members 84 extend further away from the pivot connection 102 of the drive assembly 17 with the fixed ramp portion 12 (see FIG. 6), each drive member 84 pushes against its respective cover link member 68. The cover member 15 performs a rotation about its pivot connection 109 with the fixed ramp portion 12. The multiplier link members 54 transfer and amplify the rotation of the cover member 15 to the pivotable ramp portion 14 through their pivot connections 78, 60, causing the pivotable ramp portion 14 to pivot with respect to the fixed ramp portion 12 about the pivot connection 46 between the respective side members 24, 38. The deployed position of the pivotable ramp portion 14 and opened position of the cover member 15 are illustrated in FIG. 7H, with successive intermediate positions being shown in FIGS. 7B-C-D-E-F-G.

Referring to FIG. 7H, throughout deployment of the ramp assembly 10, the pivot connection 60 between each multiplier link member 54 and the pivotable ramp portion 14 remains on a same side of an axis $V_1$ extending through the pivot connection 109 between the cover member 15 and the fixed ramp portion 12 and the pivot connection 78 between the cover member 15 and the multiplier link member 54, to ensure that the ramp assembly 10 can be returned to the stowed position. In other words, a pivot axis defined by the pivot connection 60 between each multiplier link member 54 and the pivotable ramp portion 14 remains on a same side of a plane (also corresponding to $V_1$ in FIG. 7H) containing the pivot axis defined by the pivot connection 109 between the cover member 15 and the fixed ramp portion 12 and the pivot connection 78 between the cover member 15 and the multiplier link member 54. The effective length variation of the drive assembly 17 is limited, e.g. by limiting the stroke of the linear actuator 104, in order to prevent the pivot 60 from crossing the axis or plane $V_1$.

The ramp assembly 10 is retracted to the stowed position using an opposite motion, i.e. by reducing the effective length of the drive assembly 17 through retraction of the linear actuator 104. As such, the linear actuator 104 deploys the ramp assembly 10 by a single motion along a first direction of travel, and retracts the ramp assembly 10 by single motion along the opposite direction of travel.

The above described configuration provides for a simple and effective deployment and retraction mechanism. The ramp portions, cover member, multiplier assembly and drive assembly are interconnected through simple pivot connections, which minimize the risk of failure, and the mechanism is directly driven by a linear drive, which allows for elements such as gears, belts and chains to be omitted.

Referring to FIGS. 8A-F, a ramp assembly 210 according to an alternate embodiment is shown. Similarly to the above-described embodiment, the ramp assembly 210 includes a fixed ramp portion 212, a pivotable ramp portion 214, a cover member 215, a multiplier assembly 216 and a drive assembly 217. The pivotable ramp portion 214 is connected to the fixed ramp portion 212 through a direct pivot connection 246 defined at connecting ends thereof, to pivot between a stowed position (FIG. 8A) and a deployed position (FIG. 8F) defined at more than 180° from each other. The cover member 215 is connected to the fixed ramp portion 212 through a pivot connection 209, such as to pivot between a closed position (FIG. 8A) and an opened position (FIG. 8F), defined at approximately 90° to 100° from each other. The drive assembly 217 is connected to the cover member 215 through a pivot connection 294 and pivots the cover member 215 between the closed and opened positions. Elements of the ramp assembly 210 similar to corresponding elements of the ramp assembly 10 will not be further detailed herein.

The multiplier assembly 216 includes a sliding pin 278 rigidly extending from each link member 268 of the cover member 215. Referring to FIG. 8C, the sliding pin 278 is positioned at a distance $d_1$ from the pivot connection 209 between the cover link member 268 and the pivotable ramp portion 214, which corresponds to approximately twice a distance $d_2$ defined between the sliding pin 278 and the pivot connection 246 between the ramp portions 212, 214 when the sliding pin 278 and pivot connection 246 are in vertical alignment with each other. The multiplier assembly 216 also includes a retaining member 238 outwardly spaced apart from each side wall of the pivotable ramp portion 214, and rigidly connected thereto. Each retaining member 238 includes an elongated slot 241 defined therethrough, adjacent the connecting end of the ramp portions 212, 214, such that the pivot connection 246 between the ramp portions 212, 214 is located between the connecting ends and the slot 241. Each slot slidably receives a respective one of the sliding pins 278, such as to transfer the rotation of the cover member 215 to the pivotable ramp portion 214 in an amplified manner. Alternately, the slot 241 can be directly defined through the side wall of the pivotable ramp portion 214.

As above, in a particular embodiment, the multiplier assembly 216 allows for the pivoting motion of the pivotable ramp portion 214 to be performed about an angle approximately twice that of the angle of the corresponding pivoting motion of the cover member 215.

The embodiments of the invention described above are intended to be exemplary. Those skilled in the art will therefore appreciate that the foregoing description is illustrative only, and that various alternate configurations and modifications can be devised without departing from the spirit of the present invention. Accordingly, the present invention is intended to embrace all such alternate configurations, modifications and variances which fall within the scope of the appended claims.

The invention claimed is:

1. A deployable ramp assembly comprising:
    a fixed ramp portion;
    a pivotable ramp portion pivotally connected to the fixed ramp portion through a direct pivot connection, the pivotable ramp portion being pivotable about the direct pivot connection between stowed and deployed positions with a first angle being defined between the pivotable ramp portion in the stowed position and the pivotable ramp portion in the deployed position, the pivotable ramp portion in the deployed position and the fixed ramp portion together defining a ramp surface, the pivotable ramp portion in the stowed position overlaying the fixed ramp portion;
    a cover member pivotally connected to the fixed ramp portion, the cover member being pivotable relative to the fixed ramp portion between closed and opened positions of the cover member respectively corresponding to the stowed and deployed positions of the pivotable ramp portion, a second angle smaller than the first angle being defined between the cover member in the closed position and the cover member in the opened position, the cover member in the closed position covering the direct pivot connection between the pivotable and fixed ramp portions to prevent access to interconnected ends of the ramp portions;
    a drive assembly pivoting the cover member between the closed position and the opened position, the drive assembly having one end pivotally connected to the cover member and an opposed end pivotally connected to the fixed ramp portion at a location spaced apart from the direct pivot connection, the drive assembly having a variable effective length and being actuable to pivot the cover member between the open and closed positions; and
    a multiplier assembly interconnecting the pivotable ramp portion and the cover member, the multiplier assembly transferring the pivoting motion of the cover member to the pivotable ramp portion such that an angular displacement of the pivotable ramp portion between the stowed and deployed positions thereof is greater than an angular displacement of the cover member between the closed and opened positions thereof.

2. The deployable ramp assembly according to claim 1, wherein the first angle is more than 180° and the second angle is between about 90° and about 100°.

3. The deployable ramp assembly according to claim 1, wherein a ratio between the first and second angles is approximately 2.

4. The deployable ramp assembly according to claim 1, wherein the cover member is pivotally connected to the fixed ramp portion at a location vertically or approximately vertically aligned with and below the direct pivot connection.

5. The deployable ramp assembly according to claim 1, wherein the cover member includes two parallel cover link members pivotally connected to the fixed ramp portion at a first location and pivotally connected to the drive assembly at a second location, the multiplier assembly includes two parallel multiplier link members pivotally connected to a respective one of the cover link members at a third location with the second location being defined between the first and third locations, each multiplier link member being also pivotally connected to a respective side of the pivotable ramp portion at a fourth location near the direct pivot connection, the fourth location remaining on a same side of an axis extending through the first and third locations throughout pivoting travel of the pivotable ramp portion between the stowed and deployed positions.

6. The deployable ramp assembly according to claim 1, wherein the cover member includes two parallel cover link members pivotally connected to the fixed ramp portion at a first location and pivotally connected to the drive assembly at a second location, the multiplier assembly including a sliding pin extending from each of the cover link members at a third location extending at a distance from the first location approximately twice a distance defined between the direct pivot connection and the third location when the direct pivot connection and the third location are vertically aligned, each sliding pin being slidably received in a slot defined in a respective side of the pivotable ramp portion near the direct pivot connection.

7. The deployable ramp assembly according to claim 1, wherein the drive assembly includes at least one linear actuator defining part of the effective length.

8. The deployable ramp assembly according to claim 1, wherein the drive assembly is connected to the fixed ramp portion along an underside thereof.

9. The deployable ramp assembly according to claim 4, wherein the cover member includes at least one support member rigidly extending therefrom, the pivotable ramp portion in the stowed position resting against the at least one support member.

10. The deployable ramp assembly as defined in claim 1, wherein the cover member extends transversely relative to the pivotable ramp portion.

11. The deployable ramp assembly as defined in claim 10, wherein drive assembly acts solely on the cover member to thereby displace the pivotable ramp portion between the stowed and deployed positions thereof.

12. A deployable ramp assembly for a vehicle, the ramp assembly comprising:
    a fixed ramp portion having a first ramp surface and opposed side members extending therefrom;
    a pivotable ramp portion having a second ramp surface and opposed side members extending therefrom, the side members of the pivotable ramp portion being pivotally connected to the side members of the fixed ramp portion adjacent connecting ends thereof, the pivotable ramp portion being pivotable with respect to the fixed ramp portion between a stowed position and a deployed position, the first and second ramp surfaces in the deployed position defining an at least substantially continuous ramp;

two parallel first link members each pivotally connected to a respective one of the side members of the pivotable ramp at a first location adjacent the connecting end thereof but more distanced therefrom than the connection between the side members of the pivotable and fixed ramp portions;

two parallel second link members each pivotally connected to a respective one of the first link members at a second location and pivotally connected to the fixed ramp portion at a third location, the second link members being rigidly interconnected by a transverse member extending therebetween, the transverse member covering the pivot connection between the side members of the pivotable and fixed ramp portions to prevent access thereto when the pivotable ramp is in the stowed position;

two parallel drive members each pivotally connected to a respective one of the second link members at a fourth location intermediate the second and third locations; and a variable length member having one end connected to the drive members and an opposed end pivotally connected to the fixed ramp portion, the variable length member including at least one linear actuator linearly varying a distance between the opposed ends thereof such as to pivot the pivotable ramp portion between the stowed and deployed positions.

13. The deployable ramp assembly according to claim 12, wherein the third location is vertically aligned or approximately vertically aligned with the connection between the side members of the pivotable and fixed ramp portions.

14. The deployable ramp assembly according to claim 12, wherein an angle of rotation of the second link members with respect to the fixed ramp portion is smaller than an angle of a corresponding rotation of the pivotable ramp portion with respect to the fixed ramp portion, the first link members transferring and amplifying each rotation of the second link members to the pivotable ramp portion.

15. The deployable ramp assembly according to claim 14, wherein the pivotable ramp portion has a travel of over 180° between the stowed and the deployed positions, and the second link members have a travel of between about 90° and 100° between the stowed and deployed positions of the pivotable ramp portions.

16. The deployable ramp assembly according to claim 12, wherein throughout the pivoting of the pivotable ramp portion between the stowed and deployed positions, a first pivot axis defined at the first location remains on a same side of a plane containing a second pivot axis defined at the second location and a third pivot axis defined at the third location.

17. The deployable ramp assembly according to claim 12, wherein the transverse member is pivotally connected to the fixed ramp portion to pivot about an axis extending through the third location.

18. The deployable ramp assembly according to claim 14, wherein the transverse cover member includes at least one support member extending therefrom, the pivotable ramp portion in the stowed position overlaying the fixed ramp portion and resting against the at least one support member.

19. The deployable ramp assembly according to claim 12, wherein the drive members are rigidly interconnected by a transverse member extending therebetween, and the variable length member includes a single linear actuator rigidly connected to the transverse member and pivotally connected to the fixed ramp portion.

20. The deployable ramp assembly according to claim 12, wherein the variable length member is connected to the fixed ramp portion along an underside thereof.

* * * * *